United States Patent
Maeda et al.

(10) Patent No.: US 10,207,243 B2
(45) Date of Patent: Feb. 19, 2019

(54) POLYMERIZATION REACTOR AND METHOD FOR PRODUCING WATER ABSORBENT RESIN

(71) Applicant: SUMITOMO SEIKA CHEMICALS CO., LTD., Kako-gun, Hyogo (JP)

(72) Inventors: Nobuhiro Maeda, Himeji (JP); Naoaki Hara, Himeji (JP); Junichi Takatori, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/630,564

(22) Filed: Jun. 22, 2017

(65) Prior Publication Data

US 2017/0282146 A1    Oct. 5, 2017

Related U.S. Application Data

(63) Continuation of application No. 14/382,996, filed as application No. PCT/JP2013/058618 on Mar. 25, 2013.

(30) Foreign Application Priority Data

Mar. 29, 2012   (JP) .................................. 2012-075923

(51) Int. Cl.
    *B01J 8/02*       (2006.01)
    *C08F 2/01*       (2006.01)
    (Continued)

(52) U.S. Cl.
    CPC ............... *B01J 19/02* (2013.01); *B01J 19/18* (2013.01); *C08F 2/01* (2013.01); *C08F 2/38* (2013.01);
    (Continued)

(58) Field of Classification Search
    CPC ............... B01J 19/02; B01J 2219/0204; B01J 2219/0236; B01J 2219/0227; B01J 3/04; C08F 2/01
    See application file for complete search history.

(56) References Cited

U.S. PATENT DOCUMENTS 1,896,411 A   2/1933   Maskrey
2,301,204 A   7/1939   Fields et al.
(Continued)

FOREIGN PATENT DOCUMENTS

CN    201579044 U    9/2010
EP    0 700 716 A1   3/1996
(Continued)

OTHER PUBLICATIONS

Grocki, "Stainless Steel with 6% Mo improvies Equipment Efficiency and Eliminates Costly Repair", 2003.
(Continued)

*Primary Examiner* — Lessanework Seifu
(74) *Attorney, Agent, or Firm* — Hamre, Schumann, Mueller & Larson, P.C.

(57) ABSTRACT

A polymerization reactor of the present invention includes a container body 1 and a jacket 2 covering the outer surface of the container body 1 and defining a passage for passing a cooling/heating medium between itself and the outer surface of the container body. The container body 1 is made of a clad metal plate including a support metal layer 11*a* having an inner surface at an inner side of the container body and an outer surface at an outer side of the container body, and an inner corrosion-resistant metal skin layer 11*b* bonded to the inner surface of the support metal layer and being smaller in thickness than the support metal layer.

15 Claims, 4 Drawing Sheets

(51) Int. Cl.
 *B01J 19/02* (2006.01)
 *C08F 20/00* (2006.01)
 *B01J 19/18* (2006.01)
 *C08F 2/38* (2006.01)
 *C08F 220/06* (2006.01)

(52) U.S. Cl.
 CPC ............ *C08F 20/00* (2013.01); *C08F 220/06* (2013.01); *B01J 2219/00094* (2013.01); *B01J 2219/0236* (2013.01)

(56) References Cited

U.S. PATENT DOCUMENTS

| | | |
|---|---|---|
| 3,524,725 A | 8/1970 | Cremor |
| 3,854,886 A | 12/1974 | Pursley |
| 3,901,659 A | 8/1975 | Joklik |
| 4,047,972 A | 9/1977 | Stumbar |
| 4,383,092 A | 5/1983 | Ko et al. |
| 8,084,544 B2 | 12/2011 | Fukudome et al. |
| 2007/0248504 A1 | 10/2007 | Bindelle et al. |

FOREIGN PATENT DOCUMENTS

| | | |
|---|---|---|
| GB | 2 002 397 A | 2/1979 |
| GB | 1 543 725 A | 4/1979 |
| JP | 4-16229 A | 12/1992 |
| JP | 5-337362 A | 12/1993 |
| JP | 8-100005 A | 4/1996 |
| JP | 10-244146 A | 9/1998 |
| JP | 2011-110547 A | 6/2011 |

OTHER PUBLICATIONS

Cocks, Manual of Industrial Corrosion Standards and Control, 1973.
Office Action issued in counterpart Singapore application, dated Oct. 26, 2015 (4 pages).
Supplementary European Search Report issued in counterpart European Patent Application, dated Oct. 2, 2015 (2 pages).
Office Action issued in corresponding Japanese Patent application, dated Aug. 17, 2016.

FIG.3

| | First heating Step(min.) | First cooling step(min.) | Second heating Step(min.) | Second cooling step(min.) | Third heating Step(min.) | Third cooling step(min.) | Forth heating step(min.) | Heat transfer time (min.) | Shortening effect (%) | polymerization process time(min.) |
|---|---|---|---|---|---|---|---|---|---|---|
| Examples | 88 | 22 | 26 | 107 | 48 | 132 | 54 | 477 | 21 | 567 |
| Comparative Examples | 113 | 28 | 33 | 135 | 61 | 165 | 69 | 604 | – | 694 |

POLYMERIZATION REACTOR AND METHOD FOR PRODUCING WATER ABSORBENT RESIN

FIELD OF THE INVENTION

The present invention relates to a polymerization reactor for performing polymerization reaction. In particular, the present invention relates to a polymerization reactor configured to allow heat transfer through a wall of a container body due to the flow of a cooling/heating medium. The invention also relates to a method for producing a water absorbent resin by using such a polymerization reactor.

BACKGROUND ART

FIG. 4 shows a typical polymerization reactor used for producing a polymer such as a water absorbent resin. The illustrated polymerization reactor has a container body 91 for containing e.g. a reaction solution, and an outer shell (jacket 92) that covers the outer surface of the container body 91. A cooling/heating medium (cooling medium or heating medium) is caused to flow through the inside of the jacket 92 as required, so that the content (e.g. reaction solution or reaction mixture) is cooled or heated due to heat transfer through the wall of the container body 91. Thus, the temperature of the content of the container body 91 is controlled to a predetermined temperature. The container body 91 needs to have a certain degree of strength to withstand the load of the content and the pressure during the polymerization process. Thus, the container body 91 is made of a material having excellent strength (e.g. carbon steel plate). Generally, the container body 91 is provided with an agitating element 93 for making the content homogeneous and have a uniform temperature. For instance, a polymerization reactor including a container body and an outer shell is disclosed in Patent Document 1 identified below.

In recent years, there is an increasing demand for polymers such as a water absorbent resin. To respond to such an increasing demand, it is considered to enhance the productivity by increasing the size of a polymerization reactor.

To control the content to a desired temperature in producing a polymer by using a polymerization reactor, a relatively large amount of heat needs to be transmitted by heat transfer with a cooling/heating medium. Thus, in the process of producing a polymer (hereinafter referred to as "polymerization process"), the time taken for heating or cooling the content (hereinafter referred to as "heat transfer time") accounts for a relatively large fraction. This indicates that shortening the heat transfer time can lead to enhancement of polymer production efficiency. To shorten the heat transfer time, the above-described heat transfer by heat exchange needs to be performed efficiently.

In flowing a cooling/heating medium inside the jacket, the following three are typical factors that can influence the heat transfer efficiency (heat transfer quantity Q) between the cooling/heating medium and the content through the container body. The first factor is the heat transfer resistance between the cooling/heating medium and the wall of the container body (e.g. the flow rate of the cooling/heating medium within the jacket). The second factor is the heat transfer resistance between the wall of the container body and the content (e.g. the degree of homogeneity and temperature uniformness of the content provided by the agitating element). The third factor is the heat transfer resistance of the metal of the wall of the container body itself. With respect to the first factor, the heat transfer efficiency can be improved by increasing the flow rate of the cooling/heating medium within the jacket. With respect to the second factor, the heat transfer efficiency can be improved by enhancing the homogeneity and temperature uniformity of the content provided by the agitating element. With respect to the third factor, the heat transfer efficiency can be improved by reducing the thickness of the wall of the container body. Of these three factors, the one that most influences the overall heat transfer efficiency is the third factor (metal resistance). Thus, reducing the thickness of the wall of the container body is considered to be the most effective way to shorten the heat transfer time.

However, to make a polymerization reactor larger to enhance the productivity as noted above, the container body needs to have a relatively large thickness in view of the strength. Such a large thickness leads to a decrease in the efficiency of heat transfer through the wall of the container body and hence leads to an increase in the heat transfer time, hindering the improvement of productivity.

In view of these circumstances, the structure disclosed in Patent Document 1 includes a passage for a cooling/heating medium on the inner side of the container body. Specifically, as shown in FIGS. 1 and 2 of this document, support members each comprising a strip-like plate are welded to the inner surface of the container body in an upright posture on the inner surface at predetermined intervals, and bonding plates each having a dimension corresponding to the interval between adjacent support members are welded to the ends of the support members. With this arrangement, the closed space defined by the wall of the container body, the support members and the bonding plates provides a passage for a cooling/heating medium. Providing a passage for a cooling/heating medium on the inner side of the container body in this way allows reducing the thickness of the bonding plates (i.e., the wall between the content and the cooling/heating medium), which leads to a shorter heat transfer time and an improved productivity.

However, it is difficult to check the condition inside the container body during the use of the polymerization reactor. Thus, in view of possible breakage or the like of the wall due to deterioration with time, reducing the wall thickness of the passage for a cooling/heating medium provided on the inner side of the container body and bonding the wall by welding causes poor reliability for long use.

Polymerization of water-soluble ethylenically unsaturated monomer is a mainstream method for producing a water absorbent resin. Water-soluble ethylenically unsaturated monomer is an acid substance and generally used after neutralization with sodium hydroxide. In producing a water absorbent resin by reversed phase suspension polymerization, an organic solvent is used as a reaction solvent. Since an acid, an alkali and/or an organic solvent are used in this way for polymerization reaction to produce a water absorbent resin, use of a corrosion-resistant metal such as stainless steel as the material for a polymerization reactor (container body) may be considered to be desirable. However, stainless steel is inferior to carbon steel in heat transfer ability. Thus, in the case where heating and/or cooling of the reaction solution (content) are performed by flowing a cooling/heating medium in the jacket 92 provided on the outer side of the container body in the structure shown in FIG. 4, the container body 91, when made of stainless steel, provides lower efficiency of heat transfer through its wall and the resulting longer heat transfer time, as compared with when the container body is made of carbon steel.

PRIOR ART DOCUMENT(S)

Patent Document 1: JP-A-10-244146

SUMMARY OF THE INVENTION

The present invention is conceived under the circumstances described above. It is therefore an object of the present invention to provide a polymerization reactor capable of shortening the heat transfer time during the polymerization process while maintaining reliability for long use. The present invention also relates to a method for efficiently producing a water absorbent resin using such a polymerization reactor.

According to a first aspect of the present invention, there is provided a polymerization reactor for performing polymerization reaction. A polymerization reactor comprises a container body, and a jacket covering an outer surface of the container body and defining a passage for passing a cooling/heating medium between itself and the outer surface of the container body. The container body is made of a clad metal plate comprising a support metal layer having an inner surface at an inner side of the container body and an outer surface at an outer side of the container body, and an inner corrosion-resistant metal skin layer bonded to the inner surface of the support metal layer and being smaller in thickness than the support metal layer.

Preferably, the thickness of the inner skin layer is in a range of $\frac{1}{10}$ to $\frac{1}{2}$ of the thickness of the support metal layer.

Preferably, the clad metal plate further comprises an outer corrosion-resistant metal skin layer bonded to the outer surface of the support metal layer, the outer skin layer being smaller in thickness than the support metal layer.

Preferably, the support metal layer is made of carbon steel, whereas the inner skin layer and the outer skin layer are made of stainless steel.

Preferably, the inner skin layer is larger in thickness than the outer skin layer.

Preferably, the thickness of the support metal layer is 5 to 15 mm.

Preferably, the polymerization reactor further comprises an inert gas supplier for supplying an inert gas into the passage.

Preferably, the jacket is internally portioned by a helical partition plate, the passage extending helically along the partition plate.

Preferably, the container body has an open upper end that is closed by a lid.

Preferably, the lid is made of an additional clad metal plate comprising a support metal layer having an inner surface at the inner side of the container body and an outer surface at the outer side of the container body, and an additional inner corrosion-resistant metal skin layer bonded to the inner surface of the additional support metal layer and being smaller in thickness than the additional support metal layer.

Preferably, the additional clad metal plate further comprises an additional outer corrosion-resistant metal skin layer bonded to the outer surface of the additional support metal layer, the additional outer skin layer being smaller in thickness than the additional support metal layer.

According to a second aspect of the present invention, there is provided a method for producing a water absorbent resin by subjecting a water-soluble ethylenically unsaturated monomer to reversed phase suspension polymerization in a petroleum-based hydrocarbon dispersion medium, wherein the polymerization is performed in the container body of the polymerization reactor according to the first aspect of the present invention.

Other features and advantages of the present invention will become more apparent from detailed description given below with reference to the accompanying drawings.

BRIEF DESCRIPTION OF THE DRAWINGS

FIG. 3 is a table showing Example and Comparative Example.

MODE FOR CARRYING OUT THE INVENTION

Preferred embodiments of the present invention are described below with reference to the accompanying drawings.

Figure 1:
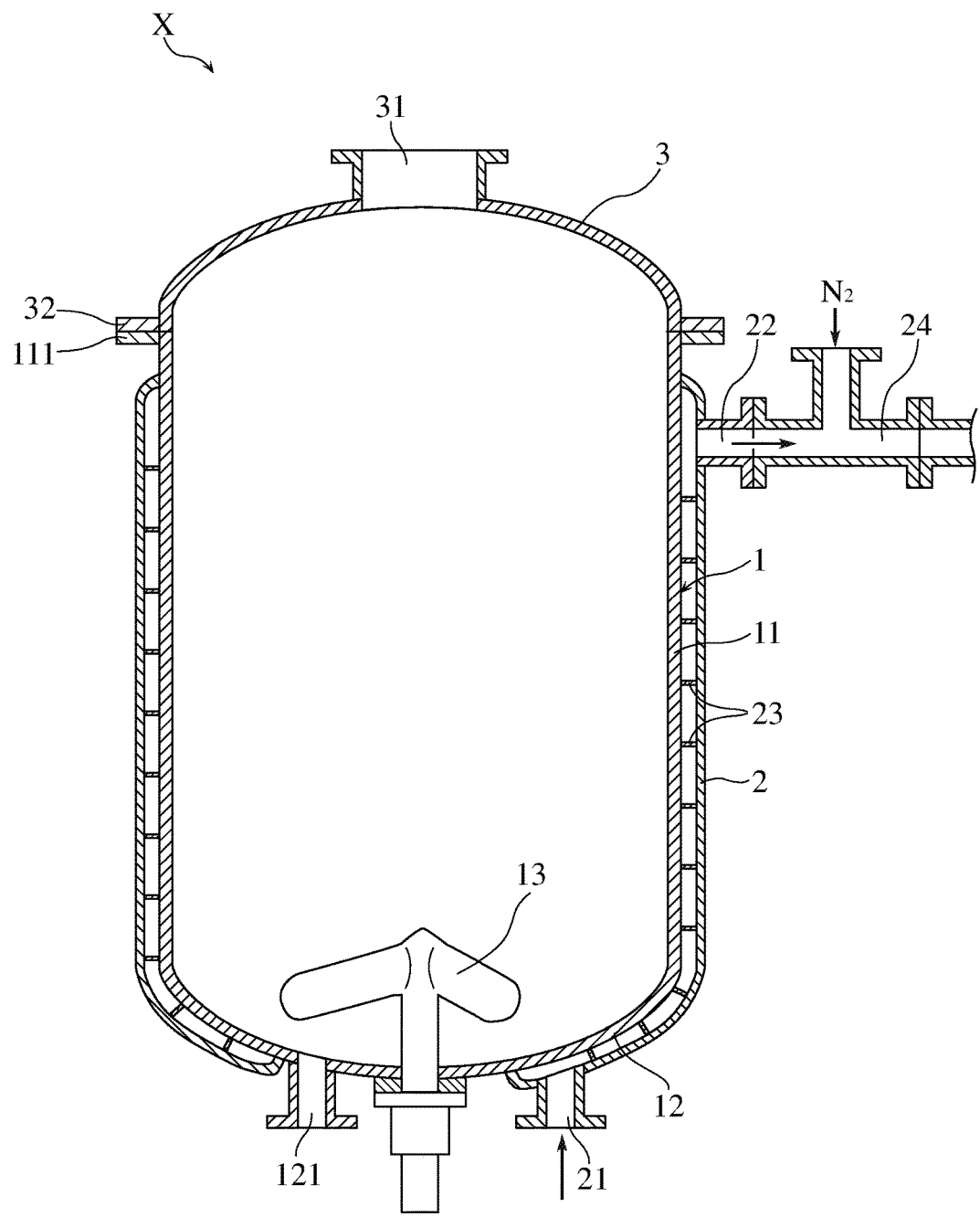
FIG. 1 is a vertical sectional view schematically showing the structure of a polymerization reactor according to an embodiment of the present invention.
Figure 2:
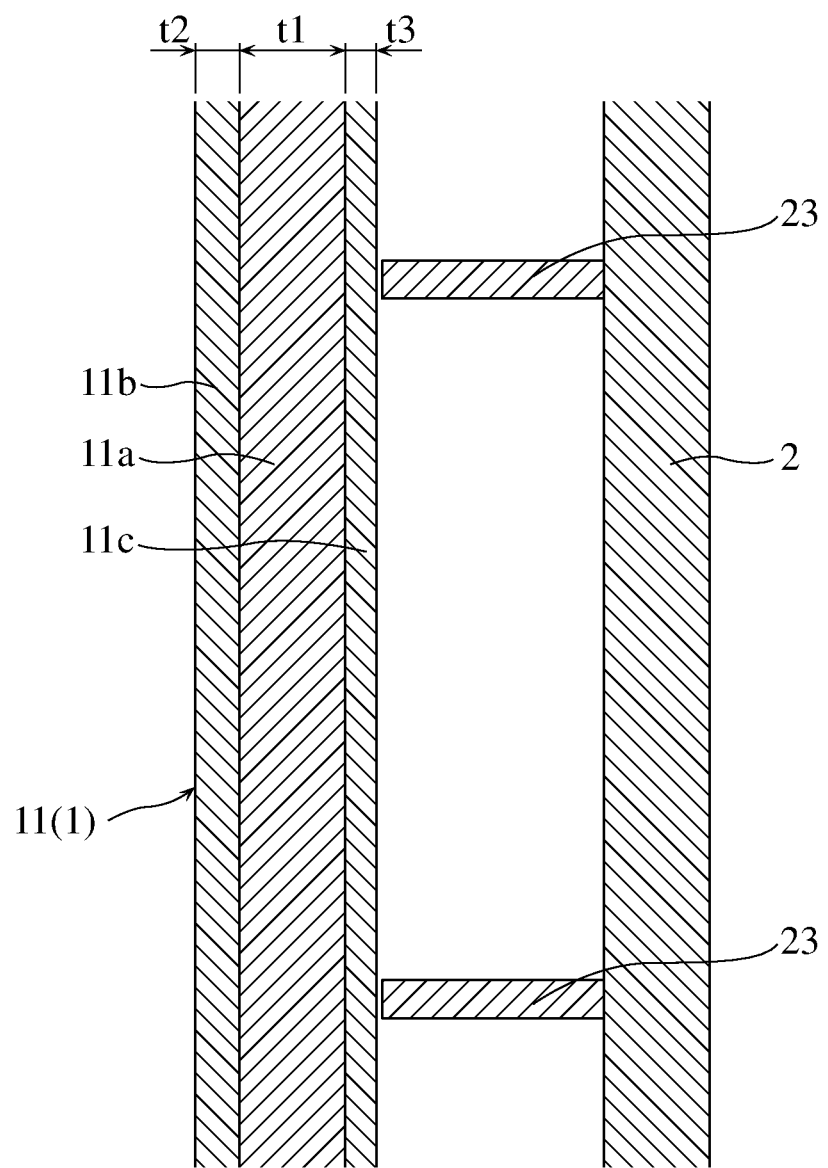
FIG. 2 shows part of FIG. 1 as enlarged.
Figure 4:
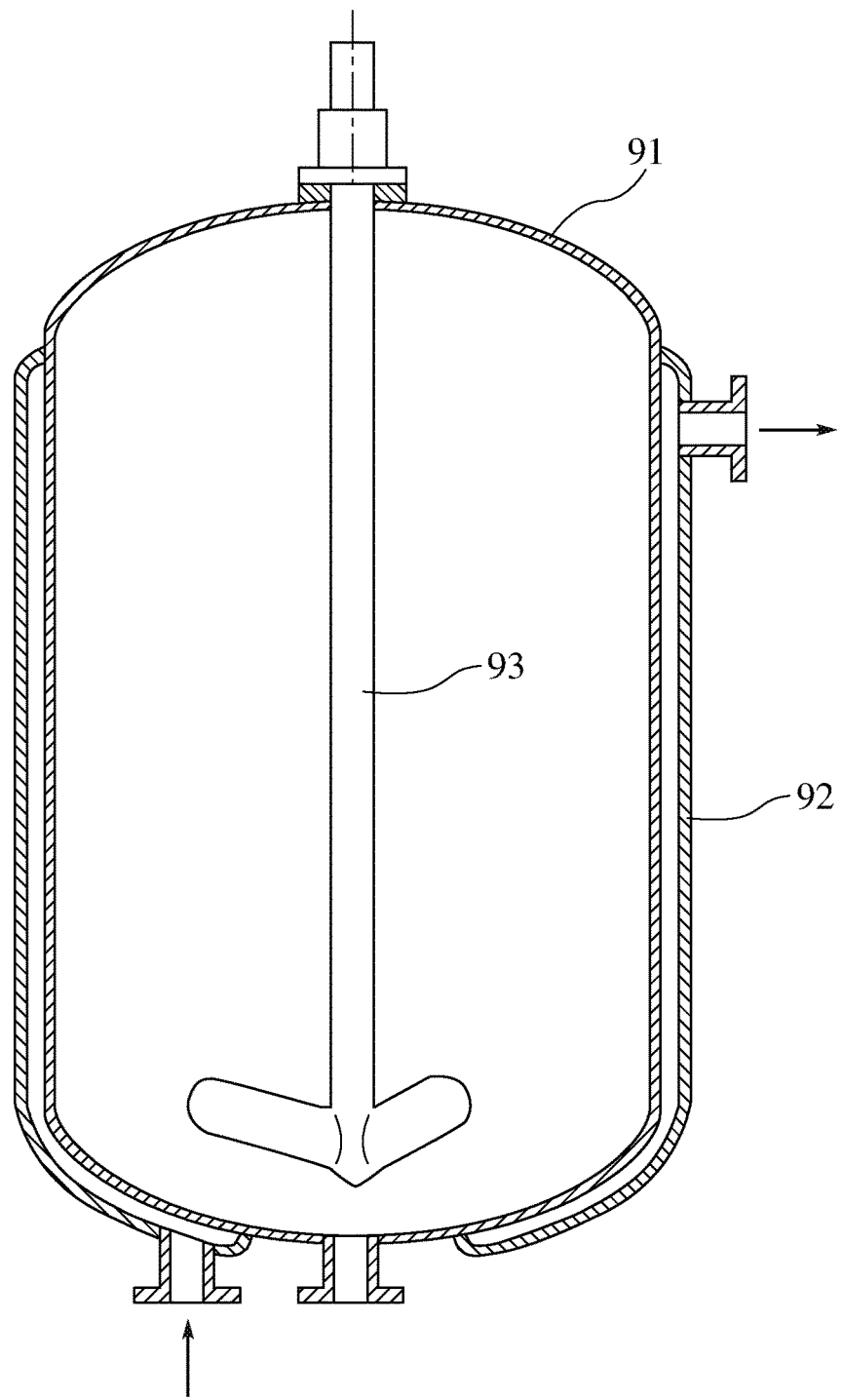
FIG. 4 is a vertical sectional view schematically showing the structure of a conventional polymerization reactor.

FIGS. 1 and 2 show an example of polymerization reactor according to the present invention. As shown in FIG. 1, the polymerization reactor X of this embodiment includes a container body 1, a jacket 2 and a lid 3.

As shown in FIG. 1, the container body 1 includes a cylindrical side wall 11 and a bottom wall 12 integrally welded to the bottom end of the side wall 11.

In this embodiment, the side wall 11 is made of three-layer clad steel plate. Specifically, as shown in FIG. 2, the three-layer clad steel plate that forms the side wall 11 comprises a support layer 11a made of carbon steel plate and skin layers 11b, 11c bonded to the opposite surfaces of the support layer 11a by e.g. hot rolling. The cylindrical side wall 11 is made by bending the three-layer clad steel into a cylindrical shape and bonding the facing edges together by welding along the axial direction of the cylindrical body. The upper end of the side wall 11 is open and has an annular flange 111 integrally formed along the outer circumference.

For instance, the side wall 11 is about 200-400 cm in diameter and about 200-600 cm in height (length in the axial direction). As for the thickness of the side wall 11, the support layer 11a has a thickness of e.g. about 5-15 mm, the inner skin layer 11b has a thickness of e.g. about 1-4 mm, and the outer skin layer 11c has a thickness of e.g. about 1-3 mm. The thickness of the inner skin layer 11b is set larger than that of the outer skin layer 11c. Preferably, the thickness of the inner skin layer 11b is within the range of $\frac{1}{10}$ to $\frac{1}{2}$ of the thickness of the support layer 11a, and more preferably, within the range of $\frac{1}{5}$ to $\frac{1}{2}$ of the thickness of the support layer 11a.

The bottom wall 12 is made of the same three-layer clad steel plate as that forming the side wall 11 into a downwardly convex shape (e.g., semispherical). The bottom wall 12 is welded to the bottom end of the side wall 11 along the circumference of the side wall 11. Though not shown in the figures, the bottom wall 12 includes a support layer and skin layers bonded to the opposite surfaces of the support layer. The thickness of the inner skin layer is larger than that of the outer skin layer. In the side wall 11 and the bottom wall 12 of the container body 1, the inner skin layers 11b are corrosion-resistant skin layers, and the outer skin layers 11c are additional corrosion-resistant skin layers.

At the bottom of the container body 1 is provided an agitating element 13 for agitating the inside of the container body 1. The agitating element 13 penetrates through the bottom wall 12 centrally thereof. The bottom wall 12 is provided with a discharge port 121 for discharging the content of the container body 1 to the outside. The volume of the container body 1 having the above-described structure is e.g. about 10-60 m$^3$.

The jacket 2 covers the outer surface of the container body 1. The jacket 2 defines a passage for flowing a cooling/heating medium between itself and the outer surface of the container body 1. The jacket 2 substantially covers the region extending from an upper portion of the side wall 11 onto the bottom wall 12. The jacket 2 is made of e.g. stainless steel and bonded to the container body 1 by welding. The jacket 2 has at the bottom an inlet 21 for introducing a cooling/heating medium into the jacket 2 and at the top an outlet 22 for discharging a cooling/heating medium from the jacket 2. The jacket 2 is internally provided with a partition 23 for causing a cooling/heating medium to flow helically around the container body 1. For instance, the partition 23 is in the form of a helical strip that is welded to the inner surface of the jacket 2 in an upright posture. The space enclosed by the outer surface of the container body 1, the inner surface of the jacket 2 and vertically adjacent portions of the partition 23 provides a helical passage. The inlet 21 is connected to a non-illustrated cooling/heating medium tank. A cooling/heating medium controlled to a desired temperature is introduced into the jacket 2 through the inlet 21. The outlet 22 is connected to a non-illustrated temperature controller. The cooling/heating medium after passing the inside of the jacket 2 is introduced into the temperature controller through the outlet 22 and controlled to a predetermined temperature, and then supplied to the cooling/heating medium tank. As will be understood, the cooling/heating medium supplied from the cooling/heating medium tank repetitively passes the jacket 2 and the temperature controller for cyclic use.

Examples of the cooling/heating medium for passing the jacket 2 include liquids such as water or ethylene glycol (antifreeze). In this embodiment, as shown in FIG. 1, a branched pipe 24 is connected to the end of the outlet 22. Nitrogen gas ($N_2$), which is an example of inert gas, may be supplied under pressure through the branching portion of the branched pipe 24 into the above-described passage in the jacket 2. On the downstream side of the branched pipe 24 is provided an on-off valve (not shown) which may be closed for stopping supply of the cooling/heating medium into the jacket. When the level of the cooling/heating medium in the jacket 2 lowers, nitrogen gas is supplied into the passage in the jacket 2, whereby air is prevented from entering the passage.

The lid 3 covers the open upper end of the container body 1. For instance, the lid 3 is made of the same three-layer clad steel plate as that forming the side wall 11. The lid 3 is formed into an upwardly convex shape (e.g., semispherical). The lid 3 has at the top a supply port 31 for supplying a reaction solution or the like. An annular flange 32 is integrally formed on the outer circumference of the bottom end of the lid 3. The container body 1 and the lid 3 are hermetically bonded together with bolts (not shown) inserted in bolt holes (not shown) formed in the flanges 111 and 32. Though not shown, an appropriate sealing member is interposed between the flange 111 of the container body 1 and the flange 32 of the lid 3 to keep the container body 1 hermetically sealed.

The use of the polymerization reactor X is described below.

The polymerization reactor X can be used as a container for performing various kinds of polymerization reaction. In this embodiment, description is given below of the use of the polymerization reactor X for reversed phase suspension polymerization to produce a water absorbent resin.

In the production of a water absorbent resin in this embodiment, a water-soluble ethylenically unsaturated monomer is subjected to reversed phase suspension polymerization in a petroleum-based hydrocarbon dispersion medium (organic solvent) in the presence of a dispersion stabilizer by using a radical polymerization initiator. Note that multistage polymerization is described in this embodiment. Multistage polymerization by reversed phase suspension polymerization is advantageous in that it realizes production of a water absorbent resin having a relatively large particle size, good water wettability, an enhanced productivity, and use of reduced amount of a dispersion stabilizer.

An example of reversed phase suspension polymerization is described below. To produce a water absorbent resin by reversed phase suspension polymerization, a petroleum-based hydrocarbon dispersion medium and a dispersion stabilizer are first loaded into a container body 1. Then, with the interior of the container body 1 being agitated with the agitating element 13, a heating medium is caused to pass the inside of the jacket 2 for heating the interior of the container body 1 to a predetermined temperature (e.g. about 90° C.) (first heating step), thereby dissolving the dispersion stabilizer in the petroleum-based hydrocarbon dispersion medium. Then, a cooling medium is caused to pass the inside of the jacket 2 to cool the interior of the container body 1 to a predetermined temperature (e.g. about 50° C.) (first cooling step).

Then, first-stage reversed phase suspension polymerization is performed by adding a first-stage monomer solution into the container body 1. Preferably, the monomer solution is prepared by adding a radical polymerization initiator to an aqueous solution of a water-soluble ethylenically unsaturated monomer. When the water-soluble ethylenically unsaturated monomer has an acid group, like acrylic acid, the acid group may be neutralized with an alkaline neutralizer. A crosslinking agent may be added to the monomer solution, as required, for polymerization.

Specifically, to perform the first-stage polymerization, the above-described first-stage monomer solution is adjusted to a predetermined temperature (e.g. about 10° C.) and added into the container body 1 so that the content of the container body 1 becomes a predetermined temperature (e.g. about 30° C.) and a stable suspension state. Then, with the interior of the container body 1 being agitated with the agitating element 13, a heating medium is caused to pass the inside of the jacket 2 to heat the interior of the container body 1 to a predetermined temperature (e.g. about 55° C.) (second heating step), thereby causing the first-stage polymerization to start. As the temperature of the content rises due to polymerization heat, a cooling medium (which may be the same as the heating medium used in starting the polymerization) is caused to pass the inside of the jacket 2 for maintaining the content at a predetermined high temperature (e.g. about 80° C.). In this way, polymerization is performed for a predetermined period of time. Then, a cooling medium is caused to pass the inside of the jacket 2 for cooling the content of the container body 1 to a predetermined temperature (e.g. about 5-30° C.) (second cooling step), whereby a first-stage reaction mixture is obtained.

Then, second-stage reversed phase suspension polymerization is performed by adding a second-stage monomer solution into the container body 1. Preferably, the monomer solution is prepared by adding a radical polymerization initiator to an aqueous solution of a water-soluble ethylenically unsaturated monomer. When the water-soluble ethylenically unsaturated monomer has an acid group, like acrylic acid, the acid group may be neutralized with an alkaline neutralizer. A crosslinking agent may be added to the monomer solution, as required, for polymerization.

Specifically, to perform the second-stage polymerization, the above-described second-stage monomer solution is adjusted to a temperature close to that of the reaction mixture in the container body 1 and added into the container body 1. Then, with the interior of the container body 1 being agitated with the agitating element 13, a heating medium is caused to pass the inside of the jacket 2 to heat the interior of the container body 1 to a predetermined temperature (e.g. about 55° C.) (third heating step), thereby causing the second-stage polymerization to start. As the temperature of the content rises due to polymerization heat, a cooling medium (which may be the same as the heating medium used in starting the polymerization) is caused to pass the inside of the jacket 2 for maintaining the content at a predetermined high temperature (e.g. about 80° C.) In this way, polymerization is performed for a predetermined period of time. Then, a cooling medium is caused to pass the inside of the jacket 2 for cooling the content of the container body 1 to a predetermined temperature (e.g. about 5-30° C.) (third cooling step), whereby a second-stage reaction mixture is obtained.

Then, third-stage reversed phase suspension polymerization is performed by adding a third-stage monomer solution into the container body 1. Preferably, the monomer solution is prepared by adding a radical polymerization initiator to an aqueous solution of a water-soluble ethylenically unsaturated monomer. When the water-soluble ethylenically unsaturated monomer has an acid group, such as acrylic acid, the acid group may be neutralized with an alkaline neutralizer. A crosslinking agent may be added to the monomer solution, as required, for polymerization.

Specifically, to perform the third-stage polymerization, the above-described third-stage monomer is adjusted to a temperature close to that of the reaction mixture in the container body 1 and added into the container body 1. Then, with the interior of the container body 1 being agitated with the agitating element 13, a heating medium is caused to pass the inside of the jacket 2 to heat the interior of the container body 1 to a predetermined temperature (e.g. about 55° C.) (fourth heating step), thereby causing the third-stage polymerization to start. As the temperature of the content rises due to polymerization heat, a cooling medium (which may be the same as the heating medium used in starting the polymerization) is caused to pass the inside of the jacket 2 for maintaining the content at a predetermined high temperature (e.g. about 80° C.). In this way, polymerization is performed for a predetermined period of time. Thus, a third-stage reaction mixture is obtained. Then, the solvent and water are separated from the third-stage reaction mixture, and the residue is dried, whereby a water absorbent resin is obtained.

In the polymerization reactor X of this embodiment, the container body 1 (side wall 11 and bottom wall 12) are made by using three-layer clad steel plate comprising a support layer 11*a* of carbon steel and skin layers 11*b*, 11*c* that are bonded to the opposite surfaces of the support layer 11*a*, thinner than the support layer 11*a* and made of stainless steel. Carbon steel that forms the support layer 11*a* has higher strength and higher heat transfer ability than stainless steel that forms the skin layers 11*b*, 11*c*. Thus, making the support layer 11*a*, which has a relatively large thickness, by using carbon steel provides a considerable strength, while keeping the thickness of the wall of the container body 1 (three-layer clad steel plate) relatively small. As described above, in each polymerization process for producing a polymer such as a water absorbent resin, the content of the container body 1 is heated or cooled by passing a cooling/heating medium (cooling medium or heating medium) in the jacket 2 provided on the outer side of the container body 1. In this heating or cooling step, the container body 1 having the above-described structure does not lower the efficiency of heat transfer through the wall of the container body 1 (walls of the side wall 11 and bottom wall 12). This assures that the heat transfer time is shortened as compared with the case where the wall of the container body 1 is made of e.g. stainless steel only.

On the other hand, the inner skin layer 11*b* of the container body 1 is made of stainless steel, so that it is less susceptible to corrosion even when brought into contact with an acid, an alkali or an organic solvent during polymerization reaction at the time of producing a water absorbent resin. The skin layer 11*b* is pressure-bonded to the support layer 11*a* so that the skin layer 11*b* and the support layer 11*a* form the clad steel plate in which two facing surfaces are entirely bonded together with uniform bonding strength. Thus, the skin layer 11*b* is prevented from coming off the support layer 11*a*, so that corrosion resistance of the inner surface of the container body 1 is reliably maintained.

The thickness of the skin layer 11*b* may be set to $\frac{1}{10}$ to $\frac{1}{2}$ of the thickness of the support layer 11*a*. Such a thickness is suitable for providing proper corrosion resistance while avoiding a decrease in strength of the container body 1.

The jacket 2 is arranged to cover the outer surface of the container body 1, and a cooling/heating medium is caused to pass between the container body 1 and the jacket 2. With this arrangement, the condition of the jacket 2 can be checked easily, as compared with e.g. the structure in which the passage for a cooling/heating medium is provided inside the container body, and hence provides excellent reliability for long use.

In this embodiment, the container body 1 (side wall 11 and bottom wall 12) includes, at its outer side, the skin layer 11*c* (12*c*) made of stainless steel. Thus, the container body 1 is prevented from being corroded by the cooling/heating medium flowing within the passage inside the jacket 2.

In this embodiment, nitrogen gas (inert gas) is supplied into the passage inside the jacket 2 to prevent air from entering the jacket 2. Thus, when a liquid that is not corrosive (e.g. pure water) is used as a cooling/heating medium, corrosion does not substantially occur at the outer surface of the container body 1, so that the outer skin layer 11*c* does not need to be provided. In this case, the container body 1 can be made of two-layer clad steel plate made up of the support layer 11*a* and the inner skin layer 11*b*.

In the process for producing a water absorbent resin by reversed phase suspension polymerization, cooling and heating are repetitively performed, and the heat transfer time accounts for a relatively large fraction of the total time taken for polymerization (polymerization process time). Thus, shortening the heat transfer time leads to considerable shortening of the polymerization process time, resulting in enhanced production efficiency.

Although an embodiment of the present invention is described above, the present invention is not limited to this and may be modified in many ways without departing from the scope of the present invention. For instance, though three-layer clad steel plate made up of the support layer 11*a*, (support metal layer) of carbon steel and skin layers 11*b*, 11*c*

(corrosion-resistant skin layers) made of stainless steel and pressure-bonded to the opposite surfaces of the support layer is used as the material for the container body 1 in the forgoing embodiment, other types of clad material may be used as the material for the container body 1. For the support metal layer, use may be made of a material other than carbon steel, such as aluminum alloy, which has high strength and high thermal conductivity. For the corrosion-resistant skin layers, use may be made of a material other than stainless steel, such as titanium, chromium or alloys of these, which are more corrosion-resistant than the support metal layer. Also, the thicknesses of the support metal layer and the corrosion-resistant skin layers can be varied depending on the materials for these layers or the volume of the container body.

EXAMPLES

Advantages of the present invention are demonstrated below by way of Inventive Example and Comparative Example.

Inventive Example

A water absorbent resin was produced by reversed phase suspension polymerization by using a polymerization reactor X having the structure schematically shown in FIGS. 1 and 2, and the time taken for each step is measured. Specifically, to produce a water absorbent resin in this example, a water-soluble ethylenically unsaturated monomer was subjected to three-stage polymerization by reversed phase suspension polymerization in a petroleum-based hydrocarbon dispersion medium (organic solvent) in the presence of a dispersion stabilizer by using a radical polymerization initiator.

The container body 1 of the polymerization reactor X used in this Example had a volume of 60 m$^3$. The agitating element 13 was a paddle agitator. The side wall 11 and the bottom wall 12 of the container body 1 were made of three-layer clad steel plate having a thickness of 18 mm. The support layer 11a was made of a carbon steel plate for pressure vessels for intermediate and moderate temperature services (JIS: SGV480; JIS: Japanese Industrial Standard) having a thickness of 13 mm. The inner skin layer 11b was made of stainless steel (JIS: SUS304) having a thickness of 3 mm. The outer skin layer 11c was made of stainless steel (JIS: SUS304) having a thickness of 2 mm.

For the first-stage polymerization, 13500 kg of n-heptane at 25° C. as a petroleum-based hydrocarbon dispersion medium and 351 kg of n-heptane solution containing 10 wt. % of polyglyceryl fatty acid ester (Tradename: Sun Soft Q-1855, manufactured by Taiyo Kagaku Kabushiki Kaisha) as a dispersion stabilizer were put into the container body 1.

Then, with the inside of the container body 1 being agitated with the agitating element 13, a heating medium (temperature: 95° C., flow rate: 1.5 m$^3$/min, these are also applicable to the following description) was caused to pass the inside of the jacket 2 for heating the content of the container body 1 to 90° C. (first heating step), whereby the dispersion stabilizer was dissolved. It took 88 minutes from the start of introducing the heating medium into the jacket 2 to the timing at which the content of the container body 1 reached 90° C. Then, a cooling medium (temperature: 1° C., flow rate: 1.5 m$^3$/min, these are also applicable to the following description) was caused to pass the inside of the jacket 2 for cooling the content of the container body 1 to 50° C. (first cooling step). It took 22 minutes from the start of introducing the cooling medium into the jacket 2 to the time at which the content of the container body 1 dropped to 50° C.

Meanwhile, 3505 kg of an aqueous solution containing 80 wt. % of acrylic acid as water-soluble ethylenically unsaturated monomer was put into another container. Then, while cooling was performed, 3890 kg of an aqueous solution containing 30 wt. % of sodium hydroxide as an alkaline neutralizer was dropped into the container to perform neutralization by 75 mol %. Then, 3.5 kg of potassium persulfate as a radical polymerization initiator, 0.7 kg of N,N'-methylene-bis-acrylamide as a crosslinking agent, and 1908 kg of water were added and dissolved, whereby the first-stage monomer in the form of an aqueous solution was prepared.

The aqueous solution of first-stage monomer was adjusted to 10° C. and the whole amount was added into the container body 1. Then, the content of the container body 1 was adjusted to 30° C., and the inside of the system was sufficiently replaced with nitrogen.

Subsequently, with the interior of the container body 1 being agitated with the agitating element 13, a heating medium was caused to pass the inside of the jacket 2 to heat the content of the container body 1 to 55° C. (second heating step), whereby polymerization was started. It took 26 minutes from the start of introducing the heating medium into the jacket 2 to the time at which the content of the container body 1 reached 55° C. After the start of polymerization, the temperature of the content of the container body 1 elevated due to polymerization heat. When the temperature of the content reached 80° C., the content was maintained at 80° C. for 30 minutes for polymerization. Then, a cooling medium was caused to pass the inside of the jacket 2 to cool the content of the container body 1 to 13° C. (second cooling step), whereby the reaction mixture of the first stage was obtained. It took 107 minutes from the start of introducing the cooling medium into the jacket 2 to the time at which the content of the container body 1 dropped to 13° C.

Meanwhile, 3505 kg of an aqueous solution containing 80 wt. % of acrylic acid as water-soluble ethylenically unsaturated monomer was put into another container. Then, while cooling was performed, 3890 kg of an aqueous solution containing 30 wt. % of sodium hydroxide as an alkaline neutralizer was dropped into the container to perform neutralization by 75 mol %. Then, 3.5 kg of potassium persulfate as a radical polymerization initiator, 0.7 kg of N,N'-methylene-bis-acrylamide as a crosslinking agent, and 1908 kg of water were added and dissolved, whereby the second-stage monomer in the form of an aqueous solution was prepared. The aqueous solution of the second-stage monomer was adjusted to 13° C. and added to the first-stage reaction mixture, and the inside of the system was sufficiently replaced with nitrogen.

Subsequently, with the interior of the container body 1 being agitated with the agitating element 13, a heating medium was caused to pass the inside of the jacket 2 to heat the content of the container body 1 to 55° C. (third heating step), whereby polymerization was started. It took 48 minutes from the start of introducing the heating medium into the jacket 2 to the time at which the content of the container body 1 reached 55° C. After the start of polymerization, the temperature of the content of the container body 1 elevated due to polymerization heat. When the temperature of the content reached 80° C., the content was maintained at 80° C. for 30 minutes for polymerization. Then, a cooling medium was caused to pass the inside of the jacket 2 to cool the content of the container body 1 to 13° C. (third cooling step), whereby the reaction mixture of the second stage was obtained. It took 132 minutes from the start of introducing the cooling medium into the jacket 2 to the time at which the content of the container body 1 dropped to 13° C.

Meanwhile, 3505 kg of an aqueous solution containing 80 wt. % of acrylic acid as water-soluble ethylenically unsaturated monomer was put into another container. Then, while cooling was performed, 3890 kg of an aqueous solution containing 30 wt. % of sodium hydroxide as an alkaline neutralizer was dropped into the container to perform neutralization by 75 mol %. Then, 3.5 kg of potassium persulfate as a radical polymerization crosslinking agent, 0.7 kg of N,N'-methylene-bis-acrylamide as a cross-linker, and 1908 kg of water were added and dissolved, whereby the third-stage monomer in the form of an aqueous solution was prepared. The aqueous solution of the third-stage monomer was adjusted to 13° C. and added to the second-stage reaction mixture, and the inside of the system was sufficiently replaced with nitrogen.

Subsequently, with the interior of the container body 1 being agitated with the agitating element 13, a heating medium was caused to pass the inside of the jacket 2 to heat the content of the container body 1 to 55° C. (fourth heating step), whereby polymerization was started. It took 54 minutes from the start of introducing the heating medium into the jacket 2 to the time at which the content of the container body 1 reached 55° C. After the start of polymerization, the temperature of the content of the container body 1 elevated due to polymerization heat. When the temperature of the content reached 80° C., the content was maintained at 80° C. for 30 minutes for polymerization, whereby the reaction mixture of the third stage was obtained. From the third-stage reaction mixture, n-heptane and water were separated by azeotropic distillation of n-heptane and water. N-heptane was returned into the container body 1, whereas 16641 kg of water was taken out of the system. Then, n-heptane was evaporated and dried, whereby 11315 kg of water absorbent resin was obtained. The time taken for each step in this Example is shown in FIG. 3.

Comparative Example

A polymerization reactor different from that of the above-described Inventive Example was used to produce a water absorbent resin by reversed phase suspension polymerization, and the time taken for polymerization process was measured.

In this Comparative Example, the water absorbent resin was produced under the same conditions as those of the above-described Example except that the container body was made of stainless steel.

Specifically, in this Comparative Example, a polymerization reactor was used which included a container body having a volume of 60 m³, which is substantially the same as that of the container body used in the above-described Example, and the same paddle agitator as that of the Example. In this comparative Example, the container body was made of stainless steel (JIS: SUS304) having a thickness of 18 mm to have substantially the same strength as that of the container body 1 of the Example. The cooling medium and the heating medium were supplied in the same manner as that in the Inventive Example.

In the first heating step, heating the content of the container body to 90° C. took 113 minutes. In the first cooling step, cooling the content of the container body to 50° C. took 28 minutes. In the second heating step, heating the content of the container body to 55° C. took 33 minutes. In the second cooling step, cooling the content of the container body to 13° C. took 135 minutes. In the third heating step, heating the content of the container body to 55° C. took 61 minutes. In the third cooling step, cooling the content of the container body to 13° C. took 165 minutes. In the fourth heating step, heating the content of the container body to 55° C. took 69 minutes. The time taken for each step in this Comparative Example is shown in FIG. 3.

As will be understood from FIG. 3, as compared with the Comparative Example in which the container body 1 was made of stainless steel, the Inventive Example in which the container body was made of a three-layer clad steel plate shortened the heat transfer time by 21%. Also, the Inventive Example shortened the polymerization process time by 18% as compared with the Comparative Example. When the water absorbent resin is produced by the batch process, enhancement of productivity is expected.

The invention claimed is:

1. A method for producing a water absorbent resin by subjecting a water-soluble ethylenically unsaturated monomer to polymerization in a dispersion medium, wherein the polymerization is performed in a polymerization reactor that comprises a container body, and a jacket covering an outer surface of the container body and defining a passage for passing a cooling/heating medium between itself and the outer surface of the container body, wherein the container body is made of a clad metal plate comprising a support metal layer having an inner surface at an inner side of the container body and an outer surface at an outer side of the container body, and an inner corrosion-resistant metal skin layer bonded to the inner surface of the support metal layer and being smaller in thickness than the support metal layer, the jacket including an inlet for introducing the cooling/heating medium into the passage and an outlet for discharging the cooling/heating medium from the passage, the outlet including a branched pipe connected to an inert gas supplier for supplying inert gas into the passage through the branched pipe; the method comprising:

a first-stage polymerization comprising adding a first-stage solution of water-soluble ethylenically unsaturated monomer to the dispersion medium in the container body together with a polymerization initiator, heating the container body to a first predetermined polymerization temperature by passing a heating medium through the jacket, and cooling the container body to a second predetermined temperature lower than the first predetermined polymerization temperature for obtaining a first-stage reaction mixture by passing a cooling medium through the jacket;

a second-stage polymerization comprising adding a second-stage solution of water-soluble ethylenically unsaturated monomer to the first-stage reaction mixture in the container body together with a polymerization initiator, heating the container body to a third predetermined polymerization temperature by passing a heating medium through the jacket for obtaining a second-stage reaction mixture; and causing the inert gas supplier to supply the inert gas into the passage through the branched pipe upon determining that a level of the cooling medium or the heating medium in the jacket is lowered during the polymerization.

2. The method according to claim 1, further comprising a third-stage polymerization comprising adding a third-stage solution of water-soluble ethylenically unsaturated monomer to the second-stage reaction mixture in the container body together with a polymerization initiator, heating the container body to a fifth predetermined polymerization temperature by passing a heating medium through the jacket for obtaining a third-stage reaction mixture.

3. The method according to claim 1, wherein the thickness of the inner skin layer is in a range of 1/10 to 1/2 of the thickness of the support metal layer.

4. The method according to claim 1, wherein the clad metal plate further comprises an outer corrosion-resistant metal skin layer bonded to the outer surface of the support metal layer, the outer skin layer being smaller in thickness than the support metal layer.

5. The method according to claim 4, wherein the support metal layer is made of carbon steel, and the inner skin layer and the outer skin layer are made of stainless steel.

6. The method according to claim 4, wherein the inner skin layer is larger in thickness than the outer skin layer.

7. The method according to claim 1, wherein the thickness of the support metal layer is 5 to 15 mm.

8. The method according to claim 1, wherein the jacket is internally partitioned by a helical partition plate, the passage extending helically along the partition plate.

9. The method according to claim 1, wherein the container body has an open upper end that is closed by a lid.

10. The method according to claim 9, wherein the lid is made of an additional clad metal plate comprising a support metal layer having an inner surface at the inner side of the container body and an outer surface at the outer side of the container body, and an additional inner corrosion-resistant metal skin layer bonded to the inner surface of the additional support metal layer and being smaller in thickness than the additional support metal layer.

11. The method according to claim 10, wherein the additional clad metal plate further comprises an additional outer corrosion-resistant metal skin layer bonded to the outer surface of the additional support metal layer, the additional outer skin layer being smaller in thickness than the additional support metal layer.

12. The method according to claim 1, wherein the container body has a volume of 10-60 $m^3$.

13. The method according to claim 1, wherein the dispersion medium comprises a petroleum-based hydrocarbon dispersion medium for realizing reversed phase suspension polymerization in the first-stage polymerization and the second-stage polymerization.

14. The method according to claim 1, wherein each of the first-stage solution and the second-stage solution additionally contains a cross-linking agent.

15. The method according to claim 2, wherein each of the first-stage solution, the second-stage solution and third-stage solution additionally contains a cross-linking agent.

* * * * *